US011143560B2

(12) United States Patent
Scotto

(10) Patent No.: US 11,143,560 B2
(45) Date of Patent: Oct. 12, 2021

(54) ELECTRONIC CIRCUIT FOR DRIVING A THERMOCOUPLE ELEMENT, TEMPERATURE SENSING DEVICE, AND METHOD FOR OBSERVING A LEAKAGE RESISTANCE OF THE THERMOCOUPLE ELEMENT

(71) Applicant: CPT Group GmbH, Hannover (DE)

(72) Inventor: Pierre Scotto, Nový Jičín (CZ)

(73) Assignee: VITESCO TECHNOLOGIES GMBH, Hanover (DE)

( * ) Notice: Subject to any disclaimer, the term of this patent is extended or adjusted under 35 U.S.C. 154(b) by 312 days.

(21) Appl. No.: 16/464,827

(22) PCT Filed: Nov. 16, 2017

(86) PCT No.: PCT/EP2017/079404
§ 371 (c)(1),
(2) Date: May 29, 2019

(87) PCT Pub. No.: WO2018/104017
PCT Pub. Date: Jun. 14, 2018

(65) Prior Publication Data
US 2019/0285485 A1    Sep. 19, 2019

(30) Foreign Application Priority Data

Dec. 8, 2016    (GB) ...................... 1620868

(51) Int. Cl.
*G01K 7/02* (2021.01)
*G01K 7/10* (2006.01)
*G01K 15/00* (2006.01)

(52) U.S. Cl.
CPC ............... *G01K 7/021* (2013.01); *G01K 7/10* (2013.01); *G01K 15/005* (2013.01); *G01K 7/02* (2013.01)

(58) Field of Classification Search
CPC ........ G01K 7/021; G01K 7/10; G01K 15/005; G01K 7/13
See application file for complete search history.

(56) References Cited

U.S. PATENT DOCUMENTS 3,387,224 A * 6/1968 Fleischer ............... G08C 15/06
330/258
4,395,347 A * 7/1983 McLaughlin ........ C11D 3/0031
510/108

(Continued)

FOREIGN PATENT DOCUMENTS

CN    1873754 A    12/2006    ............... G09G 3/30
CN    103308214 A    9/2013    ............. G01K 17/00

(Continued)

OTHER PUBLICATIONS

Chinese Office Action, Application No. 201780075911.2, 6 pages, dated May 14, 2020.

(Continued)

*Primary Examiner* — Gail Kaplan Verbitsky
(74) *Attorney, Agent, or Firm* — Slayden Grubert Beard PLLC

(57) ABSTRACT

Various embodiments include an electronic circuit for driving a thermocouple element comprising: contact electrodes for connecting cold-end electrodes of the thermocouple element; and a measurement circuit to measure a thermovoltage generated by the thermocouple element. One of the electrodes is connected to a supply voltage and a ground potential over a voltage divider having resistors with pre-defined resistance values such that a common mode voltage between the contact electrode and the ground potential is in a pre-defined range. If a leakage resistance effective between the contact electrode and the ground potential is greater than a pre-defined threshold, a processor compares the common mode voltage to the pre-defined range and generates a calibration value for the measurement circuitry if the common mode voltage is outside the range.

9 Claims, 2 Drawing Sheets

(56) References Cited

U.S. PATENT DOCUMENTS

| | | | |
|---|---|---|---|
| 6,377,180 B1 | 4/2002 | Nigst ............................ 340/584 |
| 7,841,771 B2 * | 11/2010 | Perotti .................. G01K 7/026 |
| | | | 374/179 |
| 2003/0147451 A1 * | 8/2003 | Temple-Boyer ......... G01D 3/06 |
| | | | 374/179 |
| 2013/0250999 A1 | 9/2013 | Honeck et al. ............... 374/179 |
| 2015/0276498 A1 * | 10/2015 | Van Minnen .......... G01K 7/026 |
| | | | 374/181 |
| 2016/0273976 A1 | 9/2016 | Lugli ............................... 374/1 |
| 2020/0113624 A1 * | 4/2020 | Worrell ................. H05K 3/061 |

FOREIGN PATENT DOCUMENTS

| | | | | |
|---|---|---|---|---|
| CN | 103364432 A | 10/2013 | ............. G01N 25/20 |
| GB | 2507092 A | 4/2014 | ............. G01K 15/00 |
| JP | S55-60828 A | 5/1980 | ............... G01K 1/08 |
| JP | S59-46525 A | 3/1984 | ............... G01K 7/02 |
| WO | 2018/104017 A1 | 6/2018 | ............... G01K 7/02 |

OTHER PUBLICATIONS

United Kingdom Search and Examination Report, Application No. 1620868.8, 6 pages, dated Apr. 28, 2017.
International Search Report and Written Opinion, Application No. PCT/EP2017/079404, 11 pages, dated Jan. 19, 2018.

\* cited by examiner

ELECTRONIC CIRCUIT FOR DRIVING A THERMOCOUPLE ELEMENT, TEMPERATURE SENSING DEVICE, AND METHOD FOR OBSERVING A LEAKAGE RESISTANCE OF THE THERMOCOUPLE ELEMENT

CROSS-REFERENCE TO RELATED APPLICATIONS

This application is a U.S. National Stage Application of International Application No. PCT/EP2017/079404 filed Nov. 16, 2017, which designates the United States of America, and claims priority to GB Application No. 1620868.8 filed Dec. 8, 2016, the contents of which are hereby incorporated by reference in their entirety.

TECHNICAL FIELD

The present disclosure is related to sensors. Various embodiments may include electronic circuits for using or driving a thermocouple element, temperature sensing devices comprising a thermocouple element, and/or electronic circuits.

BACKGROUND

A sensing element for high temperature sensors can be produced using a so-called mineral-insulated cable. A mineral-insulated cable can comprise a sheath of tubular shape in which to wires can be arranged that form a so-called thermocouple. For electrically insulating the wires with regard to the sheath, the space between the wires and the sheath can be filled with a mineral powder, e.g. magnesium oxide or aluminum oxide. At a so called cold-end side of the thermocouple element, the thermocouple wires generate a thermo-voltage on the basis of the thermoelectric effect. The value of the thermo-voltage is a function of the temperature difference between the cold-end side of the thermocouple element and the opposite hot-end side. The end of the wires at the cold-end side are called cold-end electrodes in the sequel.

The mineral powder inside the mineral-insulated sheath, especially magnesium oxide, is strongly hydrophilic and therefore naturally absorbs water or ambient humidity. However, absorbed water or ambient humidity leads to a degradation of the electrical insulation properties of the mineral powder. This can lead to a degradation of the temperature sensor measurement accuracy.

SUMMARY

The teachings of the present disclosure describe a system providing an accurate measurement of a temperature on the basis of a thermocouple element even in the presence of humidity in the electrically insulating mineral powder. For example, some embodiments include an electronic circuit (12) for driving a thermocouple element (11), comprising: contact electrodes (15, 16) for connecting cold-end electrodes (14) of the thermocouple element (11) and a measuring circuitry (17) that is designed to measure a thermo-voltage (18') generated by the thermocouple element (11) between the contact electrodes (15, 16) as a function of a temperature difference between the cold-end electrodes (14) and a hot-end side (31) of the thermocouple element (11), characterized in that one of the contact electrodes (16) is connected to a supply voltage (V0) and to a ground potential (23) of the electronic circuit (12) over a voltage divider (19) having resistors (21, 22) with pre-defined resistance values such that a common mode voltage (20) between the contact electrode (16) and the ground potential (23) is in a pre-defined range, if a leakage resistance (33) that is effective between the contact electrode (16) and the ground potential (23) is greater than a pre-defined threshold, wherein a supervision unit (26') is designed to compare the common mode voltage (20) to the pre-defined range and to perform a pre-defined routine, if the common mode voltage (20) is outside the range, the routine comprising generating at least one calibration value for calibrating the measurement circuitry (17).

In some embodiments, the at least one calibration value is calculated on the basis of a function or a model describing a functional relationship between the leakage resistance (33) and the common mode voltage (20) and/or a functional relationship between the leakage resistance (33) and the thermo-voltage (18').

In some embodiments, the contact electrode (16) is connected to a measurement electrode (27) of the measuring circuitry (7) over a switch (24) that is designed to alternately connect the measurement electrode (27) to the contact electrode (16) and the ground potential (23), wherein a control circuitry (26) is designed to actuate the switch (24) such the measurement circuitry (17) alternately measures the thermo-voltage (18') and the common mode voltage (20).

In some embodiments, a connection switch (25) is provided that is connected to the contact electrodes (15, 16) such that by closing the connection switch (25) a short circuit is provided between the contact electrodes (15, 16).

In some embodiments, the routine comprises generating a warning signal (37) that signals a low leakage resistance value.

In some embodiments, a ground contact electrode (36) is provided for connecting a sheath (35) of a mineral-insulated cable (34) of the thermocouple element (11) to the ground potential (23).

As another example, some embodiments include a temperature sensing device (10) comprising a thermocouple element (11) and an electronic circuit (12) as described above.

As another example, some embodiments include a method for determining a temperature related signal (V) using a thermocouple element (11) and for observing a leakage resistance (33) of the thermocouple element (11), wherein a measuring circuitry (17) measures a thermo-voltage (18') generated by the thermocouple element (11) between contact electrodes (15, 16) of the electronic circuit (12) as a function of a temperature difference between the cold-end electrodes (14) and a hot-end side (31) of the thermocouple element (11), characterized in that one of the contact electrodes (16) is connected to a supply voltage (V0) and to a ground potential (23) of the electronic circuit (12) over a voltage divider (19) having resistors (21, 22) with pre-defined resistance values, wherein the voltage divider (19) generates a common mode voltage (20) between the contact electrode (16) and the ground potential (23), wherein the common mode voltage (20) is in a pre-defined range, if the leakage resistance (33) that is effective between the contact electrode (16) and the ground potential (23) is greater than a pre-defined threshold, wherein a supervision unit (26') compares the common mode voltage (20) to the pre-defined range and performs a pre-defined routine, if the common mode voltage (20) is outside the range, the routine comprising generating at least one calibration value for calibrating the measurement circuitry (17).

BRIEF DESCRIPTION OF THE DRAWINGS

In the following an exemplary implementation of the teachings herein is described. The figures show.

DETAILED DESCRIPTION

Figure 1:
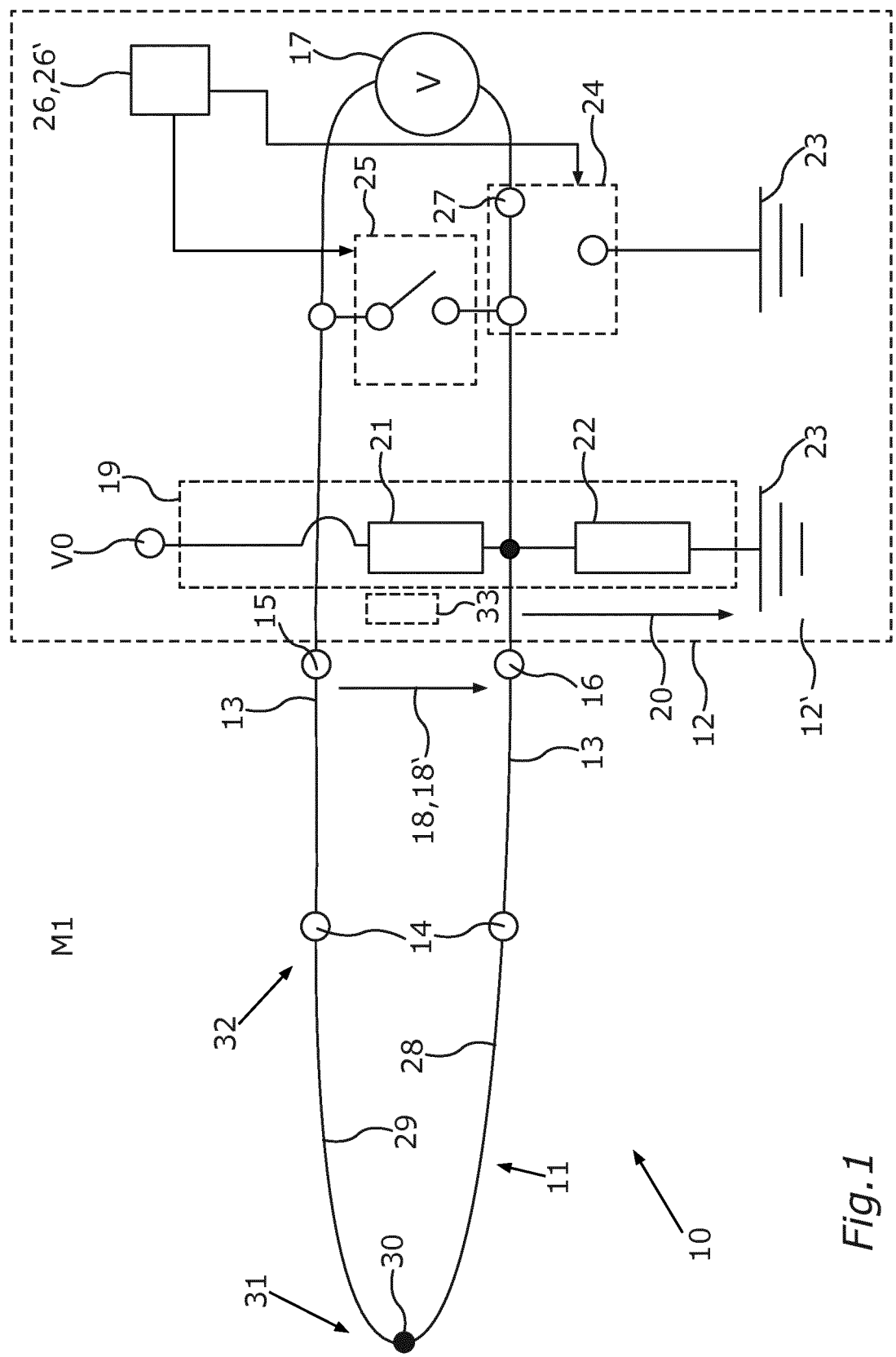
FIG. 1 a schematic illustration of an example embodiment of a temperature sensing device incorporating teachings of the present disclosure in a first measuring mode.

The teachings herein describe an electronic circuit for using or driving a thermocouple element. The thermocouple element may be connected to this electronic circuit. To this end, contact electrodes are provided for connecting the cold-end electrodes of the thermocouple element. The cold-end electrodes may be connected to the contact electrodes, e.g., by means of extension wires. In some embodiments, the electronic circuit comprises a measuring circuitry designed to measure the thermo-voltage generated by the thermocouple element between the contact electrodes, if the cold-end electrodes are connected to the contact electrodes. The measuring circuitry can be designed according to the prior art.

The thermo-voltage is a function of a temperature difference between the cold-end electrodes and the hot-end side of the thermocouple element. The value of the thermo-voltage therefore provides an information about the relative temperature difference between the cold-end electrodes and the hot-end side of the thermocouple element. In order to ensure that this measurement of the thermo-voltage is not influenced by a leakage resistance caused by, e.g., humidity, an electronic circuit incorporating the teachings herein may provide additional features.

For example, in some embodiments, one of the contact electrodes is connected to both a supply voltage and a ground potential of the electronic circuit. This connection is provided by a voltage divider having resistors with pre-defined resistance values. In other words, said contact electrode can be connected to the supply voltage over one of the resistors. The contact electrode can be connected to the ground potential over another one of the resistors. By connecting the contact electrode to a voltage divider a common mode voltage, CMV, is generated between the contact electrode and the ground potential. The value of the common mode voltage is in a pre-defined range, if a leakage resistance that is effective between the contact electrode and the ground potential is greater than a pre-defined threshold.

In other words, if the leakage resistance is above the threshold, the value of the common mode voltage is essentially defined by the resistance values of the resistors of the voltage divider. However, if the leakage resistance is below the threshold, the leakage resistance has an effect similar to an additional resistor that is connected in parallel to the resistor connecting the contact electrode to the ground potential. In other words, the effective resistance of the parallel connection of the resistor and the leakage resistance results in an effective resistance value that lowers the common mode voltage, such that the value of the common mode voltage is outside the pre-defined range. In other words, the example electronic circuits described herein provide the possibility to observe the value of the leakage resistance by measuring the common mode voltage that is effective between one of the contact electrodes and the ground potential.

In some embodiments, there is supervision unit designed to compare the common mode voltage to the pre-defined range or range of values. The supervision unit performs a pre-defined routine, if the common mode voltage is outside the range. In other words, the supervision unit detects a leakage resistance that is too low for providing a precise measurement of the thermo-voltage. In this case, the pre-defined routine is performed. The supervision unit may comprise a microcontroller or a comparator.

In some embodiments, the routine comprises generating at least one calibration value for calibrating the measurement circuitry. In other words, the measurement circuitry is adapted to the current value of the leakage resistance. This provides the possibility to obtain a precise measurement of the thermo-voltage and/or the temperature by taking into account or by compensating the value of the leakage resistance. A single calibration value can be, e.g., a bias value (e.g. −3° C.) for correcting or adapting e.g. a temperature value that is calculated on the basis of a pre-defined standard routine that does not consider the value of the leakage resistance. Several calibration values can provide a mathematical description, e.g. a mathematical function, for relating the thermo-voltage and to a temperature. Thus, by means of the at least one calibration value, a difference between the measured temperature value and a true temperature value of the temperature is reduced.

In some embodiments, the at least one calibration value can be generated or calculated on the basis of a function or a model describing a functional relationship between the leakage resistance and the common mode voltage and/or a functional relationship between the leakage resistance and the thermo-voltage. Such a function or a model can be provided, e.g., in the form of a table or on the basis of a parametric formula. By using such a function or model, the measurement of the common mode voltage can be used to derive the value of the leakage resistance and/or to determine the true value of the thermo-voltage, in the case that the measurement of the thermo-voltage between the contact electrodes is influenced by the leakage resistance.

In some embodiments, to use the measuring circuitry for both the measurement of the thermo-voltage and the measurement of the common mode voltage, said contact electrode may be connected to a measurement electrode of the measuring circuitry over a switch that is designed to alternately connect the measurement electrode to the contact electrode and the ground potential in the other case. The electronic circuit comprises a control circuitry that is designed to actuate the switch such that the measurement circuitry alternately measures the thermo-voltage and the common mode voltage. Thus, one single measurement circuitry can be used for both the measurement of the thermo-voltage for determining the temperature and the measurement of the common mode voltage for observing or determining the leakage resistance. The control circuitry can be provided on the basis of a microcontroller.

In some embodiments, there is a further switch called a connection switch. The connection switch is connected to the contact electrodes such that by closing the connection switch a short circuit is provided between the contact electrodes. The thermo-voltage does not influence the measurement of the common mode voltage if the connection switch is closed. This provides a more precise measurement of the leakage resistance. By opening the connection switch, the thermo-voltage is available between the contact electrodes.

In some embodiments, the routine may also comprise generating a warning signal that signals a low leakage resistance value. The term "low" means that the leakage resistance value is outside the described range. By generating the warning signal, a user of the electronic circuit or a system receiving the measured values of the thermo-voltage or a value of a temperature derived from the thermo-voltage can be informed that the measurement may be influenced or falsified by a low leakage resistance.

In some embodiments, there is a ground contact electrode for connecting a sheath of a mineral-insulated cable of the thermocouple element to the ground potential. The leakage resistance that is caused by water and/or ambient humidity inside the sheath can be observed on the basis of the electronic circuit.

Combining a thermocouple element with an electronic circuit provides a temperature sensing device.

Some embodiments include a method for determining a temperature related signal using a thermocouple element described herein and for observing a leakage resistance of the thermocouple element. The temperature related signal can be, e.g., the measurement signal of the thermo-voltage or a temperature signal derived from the thermo-voltage, e.g., by scaling. In the described way, a measuring circuitry measures a thermo-voltage generated by the thermocouple element between contact electrodes of the electronic circuit as a function of the temperature difference between the cold-end electrodes and a hot-end side of the thermocouple element. As was already described, one of the contact electrodes is connected to a supply voltage and to a ground potential of the electronic circuit over a respective resistor of a voltage divider wherein the resistors have pre-defined resistance values. Thus, the voltage divider generates a common mode voltage between the contact electrode and the ground potential wherein the common mode voltage is in a predefined range, if a leakage resistance that is effective between the contact electrode and the ground potential is greater than a pre-defined threshold.

However, in the embodiment described below, the described components of the embodiment each represent individual features of the teachings herein which are to be considered independently of each other and which each develop the options also independently of each other and thereby are also to be regarded as a component of the teachings in individual manner or in another than the shown combination. Furthermore, the described embodiment can also be supplemented by further features already described. In the figures elements that provide the same function are marked with identical reference signs.

FIG. 1 shows a temperature sensing device 10 comprising a thermocouple element 11 and an electronic circuit 12 and wires 13 that connect cold-end electrodes 14 of the thermocouple element 11 with contact electrodes 15, 16 of the electronic circuit 12.

Electronic circuit 12 can be, e.g., based on a printed circuit board 12'. The electronic circuit 12 can comprise a voltage measuring circuitry 17 to measure a voltage 18 between the contact electrodes 15, 16. Measuring circuitry 17 can generate a measurement signal V as a function of measured voltage 18. The voltage measuring circuitry 17 can be designed as is known from the prior art.

In some embodiments, the electronic circuit 12 can comprise a voltage divider 19 which is connected to one of the contact electrodes 16 and is designed to provide a voltage 20 at the contact electrode 16. The voltage divider 19 comprising resistors 21, 22 for dividing a supply voltage V0 in the known manner in order to provide the voltage 20. The voltage divider 19 can connect the supply voltage V0 with a ground potential 23. Further, the electronic circuit 12 can comprise switches 24, 25. The switches 24, 25 can be provided, e.g., as transistors or as relay.

In some embodiments, the switches 24, 25 can be controlled by a control circuitry 26. The switch 24 can be controlled to either connect the contact electrode 16 with a measurement electrode 17 of the voltage measuring circuitry 17 or to connect the measurement electrode 27 to the ground potential 23. Switch 25 can be controlled to alternately provide a short circuit between the contact electrodes 15, 16 and to disconnect the contact electrodes 15, 16. Control circuitry 26 can comprise, e.g., a microcontroller.

FIG. 1 shows the temperature sensing device 10 in a measuring mode M1 for measuring a thermo-voltage 18' as voltage 18. To this end, control circuitry 26 controls switches 24, 25 such that switch 24 connects the measurement electrode 27 with contact electrode 16 and switch 25 disconnects contact electrodes 15, 16. Voltage divider 19 does not have an influence on the measurement of thermo-voltage 18' by the voltage measuring circuitry 17. The thermo-voltage 18' is generated by two thermocouple wires 28, 29 which are connected by a jointing 30 at a so-called hot-end side 31 of the thermocouple element 11. Thermo-voltage 18' is a function of the difference of temperatures at hot-end side 31 and the so-called cold-end side 32 at which cold-end electrodes 14 are connected to wires 13. The voltage measured by measuring circuitry 17 in measuring mode M1 is thus a function of the temperature difference.

Figure 2:
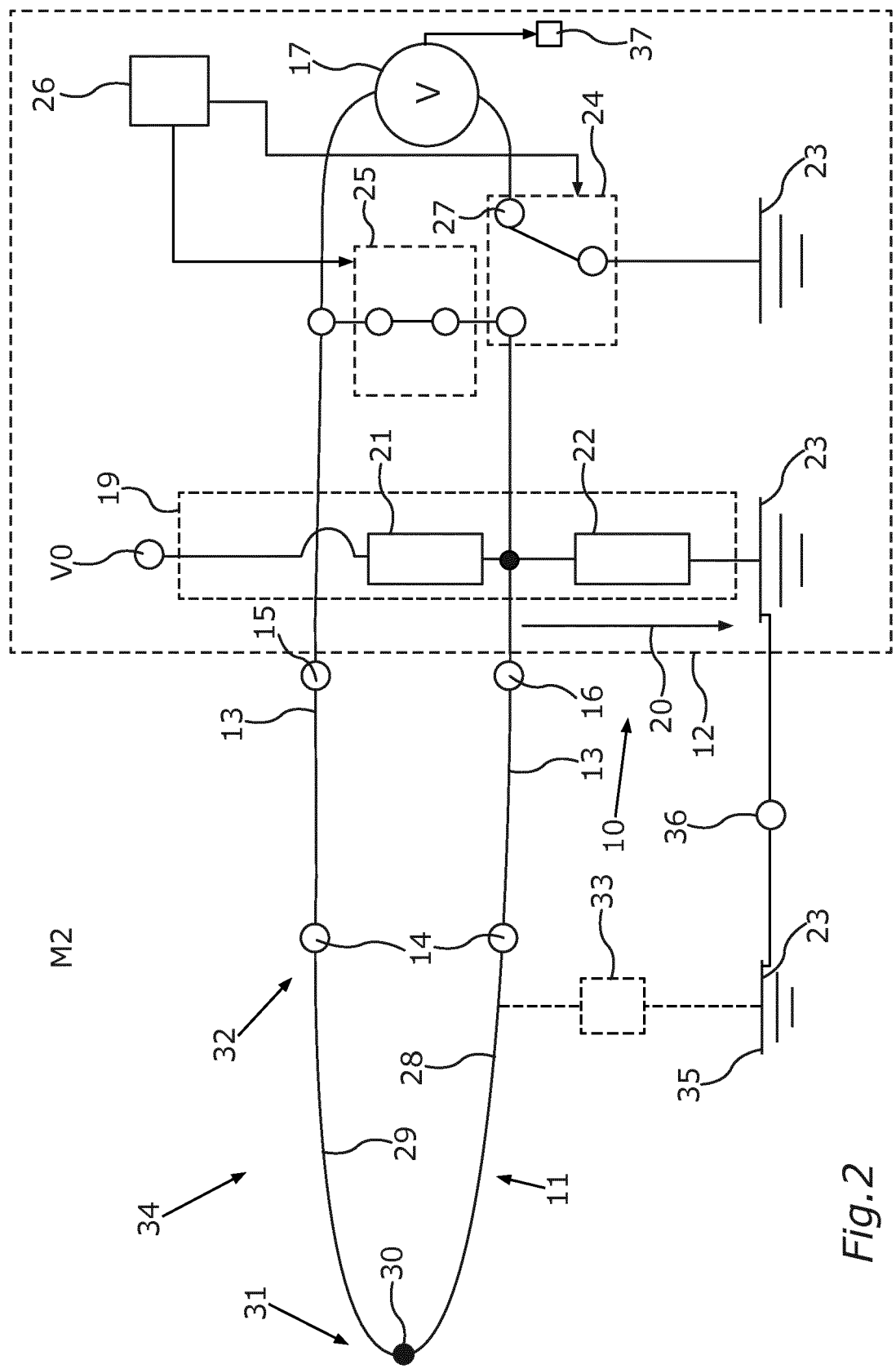
FIG. 2 a schematic illustration of the example temperature sensing device in a second measuring mode.

FIG. 2 illustrates a second measurement mode M2 for determining or checking a value of a leakage resistance 33. Leakage resistance 33 is not an electric element, but can result, e.g. from moisture that can have reached wires 28, 29 of thermocouple element 11. For example, wires 28, 29 can be part of a mineral-insulated cable 34. The leakage resistance 33 can be effective between the wires 28, 29 and an outer sheath 35 of the cable 34. The sheath 35 can be electrically connected to a ground contact electrode 36 of electronic circuit 12. Ground contract electrode 36 can be connected to the ground potential 23. If the value of leakage resistance 33 is above a predefined threshold, voltage 20 that is generated by voltage divider 19 has a value in a pre-defined range.

In the second measurement mode M2, switch 24 is switched such that measurement electrode 27 of voltage measuring circuitry 17 is connected to ground potential 23 in order to measure voltage 20. Switch 25 is closed to provide a short circuit between contact electrodes 15, 16. In other words, in measurement mode M2 voltage measuring circuitry 17 is connected to ground potential at the measuring contract 27 and to electrode 16 (by passing the thermocouple element 11) at another measuring electrode.

With leakage resistance 33 above the said threshold, the only significant electric current flows through resistor 22 resulting in a value for voltage 20 in a pre-defined range. However, if leakage resistance 33 is below the given threshold, voltage 20 results in a lower value than defined by the range. This can be detected using voltage measuring circuitry 17. For example, the microcontroller that is used for providing the control circuitry 26 can also provide a supervision circuitry 26'. If the measured voltage 20 is below a certain threshold, a signal 37 can be generated indicating that the leakage resistance 33 is too low. In some embodiments, a calibration can be performed such that the value of leakage resistance 33 is considered or compensated in measurement mode M1.

This solves the problem of accuracy in the three following steps:

a) by establishing a relationship between insulation resistance 33 and change of measured thermocouple voltage 18 with respect to real thermos-voltage 18';

b) by extracting from the CMV value 20 the electrical isolation resistance 33;

c) by compensating the thermo-voltage shift to restore the measurement accuracy of the temperature sensing device 10.

The principle behind this solution lies in establishing a relationship between isolation resistance 33 and the thermo-voltage shift and using it for compensation. This results in a more robust design with respect to humidity intrusion into the thermocouple element 11.

Some embodiments may provide:

a) an improvement of the measurement accuracy over lifetime;

b) a more robust sensor design; and/or c) a cost benefit, since efforts to tighten the thermocouple element 11 may be reduced.

One possible method for measuring the thermo-voltage 18' and the leakage resistance 33 can be performed with the device 10 illustrated in FIG. 1 and FIG. 2:

a) Measurement of the thermo-voltage 18' between contact electrodes 15, 16 (FIG. 1, M2);

b) Measurement of common mode voltage 20, whereas contact electrodes 15, 16 are in short circuit. (FIG. 2, M2);

c) Computation of a thermo-voltage shift due to electrical isolation resistance drop;

d) Correction for this effect on the thermo-voltage value measured in measurement mode M1; and e) Standard computation of hot junction temperature at hot-end side 31 from corrected thermo-voltage.

Overall, the example shows compensation for insulation resistance drop in a thermocouple based high-temperature sensor.

What is claimed is:

1. An electronic circuit for driving a thermocouple element, the electronic circuit comprising:
   contact electrodes for connecting cold-end electrodes of the thermocouple element;
   a measurement circuit to measure a thermo-voltage generated by the thermocouple element between the contact electrodes as a function of a temperature difference between the cold-end electrodes and a hot-end side of the thermocouple element; and
   a processor;
   wherein one of the contact electrodes is connected to a supply voltage and to a ground potential of the electronic circuit over a voltage divider having resistors with pre-defined resistance values such that a common mode voltage between the contact electrode and the ground potential is in a pre-defined range;
   if a leakage resistance effective between the contact electrode and the ground potential is greater than a pre-defined threshold, the processor compares the common mode voltage to the pre-defined range and generates a calibration value for the measurement circuitry if the common mode voltage is outside said pre-defined range.

2. An electronic circuit according to claim 1, wherein the calibration value depends on a model describing a functional relationship between the leakage resistance and the common mode voltage.

3. An electronic circuit according to claim 1, wherein the contact electrode is connected to a measurement electrode of the measurement circuit over a switch configured to alternately connect the measurement electrode to the contact electrode and to the ground potential; and
   further comprising a control circuit configured to actuate the switch so the measurement circuit alternately measures the thermo-voltage and the common mode voltage.

4. An electronic circuit according to claim 1, further comprising a connection switch connected to the contact electrodes to provide a short circuit between the contact electrodes when the connection switch is closed.

5. An electronic circuit according to claim 1, wherein the processor is configured to generate a warning signal if it detects a low leakage resistance value.

6. An electronic circuit according to claim 1, further comprising a ground contact electrode for connecting a sheath of a mineral-insulated cable of the thermocouple element to the ground potential.

7. A temperature sensing device comprising:
   a thermocouple element;
   contact electrodes for connecting cold-end electrodes of the thermocouple element;
   a measurement circuit to measure a thermo-voltage generated by the thermocouple element between the contact electrodes as a function of a temperature difference between the cold-end electrodes and a hot-end side of the thermocouple element;
   wherein one of the contact electrodes is connected to a supply voltage and to a ground potential of the electronic circuit over a voltage divider having resistors with pre-defined resistance values such that a common mode voltage between the contact electrode and the ground potential is in a pre-defined range, if a leakage resistance effective between the contact electrode and the ground potential is greater than a pre-defined threshold; and
   a processor to compare the common mode voltage to the pre-defined range and to generate a calibration value for the measurement circuitry if the common mode voltage is outside said pre-defined range.

8. A method for determining a temperature related signal using a thermocouple element and observing a leakage resistance of the thermocouple element, the method comprising:
   measuring a thermo-voltage generated by the thermocouple element between contact electrodes as a function of a temperature difference between the cold-end electrodes and a hot-end side of the thermocouple element;
   wherein one of the contact electrodes is connected to a supply voltage and a ground potential of an electronic circuit over a voltage divider having resistors with pre-defined resistance values;
   generating a common mode voltage with the voltage divider between the contact electrode and the ground potential, wherein the common mode voltage is in a pre-defined range;
   if a leakage resistance effective between the contact electrode and the ground potential exceeds a pre-defined threshold, comparing the common mode voltage to the pre-defined range; and
   if the common mode voltage is outside said pre-defined range, generating a calibration value for calibrating the measurement circuit.

9. An electronic circuit according to claim 1, wherein the calibration value depends on a model describing a functional relationship between the leakage resistance and the thermo-voltage.

* * * * *